(12) United States Patent
Mao et al.

(10) Patent No.: US 10,504,010 B2
(45) Date of Patent: Dec. 10, 2019

(54) SYSTEMS AND METHODS FOR FAST NOVEL VISUAL CONCEPT LEARNING FROM SENTENCE DESCRIPTIONS OF IMAGES

(71) Applicant: Baidu USA, LLC, Sunnyvale, CA (US)

(72) Inventors: Junhua Mao, Los Angeles, CA (US); Wei Xu, Saratoga, CA (US); Yi Yang, San Jose, CA (US); Jiang Wang, Santa Clara, CA (US); Zhiheng Huang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 407 days.

(21) Appl. No.: 15/418,401

(22) Filed: Jan. 27, 2017

(65) Prior Publication Data

US 2017/0147910 A1 May 25, 2017

Related U.S. Application Data

(63) Continuation-in-part of application No. 15/166,177, filed on May 26, 2016.

(60) Provisional application No. 62/289,088, filed on Jan. 29, 2016, provisional application No. 62/236,784, filed on Oct. 2, 2015.

(51) Int. Cl.
*G06K 9/72* (2006.01)
*G06N 3/04* (2006.01)
*G06K 9/62* (2006.01)
*G06F 17/27* (2006.01)

(52) U.S. Cl.
CPC ............ *G06K 9/726* (2013.01); *G06K 9/627* (2013.01); *G06N 3/0445* (2013.01); *G06N 3/0454* (2013.01); *G06F 17/2785* (2013.01)

(58) Field of Classification Search
CPC ...... G06K 9/726; G06K 9/627; G06N 3/0445; G06N 3/0454; G06F 17/2785
See application file for complete search history.

(56) References Cited

U.S. PATENT DOCUMENTS

2017/0061250 A1 3/2017 Gao
2018/0204120 A1 7/2018 Rei
2018/0367475 A1* 12/2018 Galley ................. G06N 3/0445

OTHER PUBLICATIONS

Cui et al, KNET: A General Framework for Learning Word Embedding using Morphological Knowledge, 2014, arxiv (Year: 2014).*
Donahue et al., "Decaf: A deep convolutional activation feature for generic visual recognition," arXiv preprint arXiv:1310.1531, 2013 (10pgs).

(Continued)

*Primary Examiner* — Austin Hicks
(74) *Attorney, Agent, or Firm* — North Weber & Baugh LLP

(57) ABSTRACT

Described herein are systems and methods that address the task of learning novel visual concepts, and their interactions with other concepts, from a few images with sentence descriptions. Using linguistic context and visual features, embodiments are able to efficiently hypothesize the semantic meaning of new words and add them to model word dictionaries so that they can be used to describe images which contain these novel concepts. In the experiments, it was shown that the tested embodiments effectively learned novel visual concepts from a few examples without disturbing the previously learned concepts.

20 Claims, 14 Drawing Sheets

(56) References Cited

OTHER PUBLICATIONS

Elhoseiny et al., "Write a classifier: Zero-shot learning using purely textual descriptions," In ICCV, pp. 2584-2591, 2013 (8pgs).
Elliott et al., "Comparing automatic evaluation measures for image description," In ACL, 2:452-457, 2014 (6pgs).
Elman et al., "Finding structure in time," Cognitive science, 14(2):179-211, 1990 (33pgs).
Fang et al., "From captions to visual concepts and back," arXiv preprint arXiv:1411.4952, 2014 (10pgs).
Fei-Fei et al., "One-shot learning of object categories," TPAMI, 28(4):594-611, 2006 (18pgs).
Frome et al., "Devise: A deep visual-semantic embedding model," In NIPS, pp. 2121-2129, 2013 (11pgs).
Gao et al., "Are you talking to a machine? dataset and methods for multilingual image question answering," In NIPS, 2015 (10pgs).
Girshick et al., "Rich feature hierarchies for accurate object detection and semantic segmentation," In CVPR, 2014 (21pgs).
Gupta et al., "From image annotation to image description," In ICONIP, 2012 (8pgs).
Mikolov et al., "Distributed representations of words and phrases and their compositionality," In NIPS, pp. 3111-3119, 2013 (9pgs).
Mitchell et al., "Midge: Generating image descriptions from computer vision detections," In EACL, 2012 (10pgs).
Ouyang et al., "Deepid-net: multi-stage and deformable deep convolutional neural networks for object detection," arXiv preprint arXiv:1409.3505, 2014 (13pgs).
Papineni et al., "Bleu: a method for automatic evaluation of machine translation," In ACL, pp. 311-318, 2002 (8pgs).
Russakovsky et al., "ImageNet Large Scale Visual Recognition Challenge," 2014 (43pgs).
Salakhutdinov et al., "One-shot learning with a hierarchical nonparametric bayesian model," 2010 (13pgs).
Sharmanska et al., "Augmented attribute representations," In ECCV, pp. 242-255, 2012 (14pgs).
Simonyan et al., "Very deep convolutional networks for large-scale image recognition," arXiv preprint arXiv:1409.1556, 2014 (14pgs).
Socher et al., "Zeroshot learning through cross-modal transfer," In NIPS, pp. 935-943, 2013 (10pgs).
Socher et al., "Grounded compositional semantics for finding and describing images with sentences," In TACL, 2014 (12pgs).
Sutskever et al., "Sequence to sequence learning with neural networks," In NIPS, pp. 3104-3112, 2014 (9 pgs).
Swingley et al., "Fast mapping and slow mapping in children's word learning. Language learning and Development," 6(3):179-183, 2010 (5 pgs).
Tommasi et al., "Learning categories from few examples with multi model knowledge transfer," TPAMI, 36(5):928-941, 2014 (8 pgs).
Vedantam et al., "Cider: Consensus-based image description evaluation," arXiv preprint arXiv:1411.5726, 2014 (10 pgs).
Vinyals et al., "Show and tell: A neural image caption generator," arXiv preprint arXiv:1411.4555, 2014 (9 pgs).
Weston et al., "Large scale image annotation: learning to rank with joint word-image embeddings," Machine learning, 81(1):21-35, 2010 (16 pgs).
Xu et al., "Show, attend and tell: Neural image caption generation with visual attention," arXiv preprint arXiv:1502.03044, 2015 (22 pgs).
Zeiler et al., "Adadelta: an adaptive learning rate method," arXiv preprint arXiv:1212.5701, 2012 (6 pgs).
Zhu et al., "Learning from weakly supervised data by the expectation loss svm (e-svm) algorithm," In NIPS, pp. 1125-1133, 2014 (9 pgs).
Mao et al., "Learing Like a Child:Fast Novel Visual Concept Learning from Sentence Descriptions of Images," arXiv preprint arXiv:1504.06692v2 (10 pgs).
Lazaridou et al., "Is this a wampimuk? cross-modal mapping between distributional semantics and the visual world," In ACL, pp. 1403-1414, 2014 (25pgs).
Lebret et al., "Simple image description generator via a linear phrase-based approach," arXiv preprint arXiv:1412.8419, 2014 (7pgs).
LeCun et al., "Efficient backprop," In Neural networks: Tricks of the trade, pp. 9-48, Springer, 2012 (44pgs).
Lin et al., "Microsoft coco: Common objects in context," arXiv preprint arXiv:1405.0312, 2014 (15pgs).
Ma et al., "Multimodal convolutional neural networks for matching image and sentence," arXiv preprint arXiv:1504.06063, 2015 (11pgs).
Malinowski et al., "A multi-world approach to question answering about real-world scenes based on uncertain input," In NIPS, pp. 1682-1690, 2014 (9pgs).
Malinowski et al., "A pooling approach to modelling spatial relations for image retrieval and annotation," arXiv preprint arXiv:1411.5190, 2014 (9pgs).
Mao et al., "Deep captioning with multimodal recurrent neural networks (m-rnn)," In ICLR, 2015 (17pgs).
Mao et al., "Explain images with multimodal recurrent neural networks," In NIPS Deep Learning Workshop, 2014 (9pgs).
Mikolov et al., "Recurrent neural network based language model," In INTERSPEECH, pp. 1045-1048, 2010 (4pgs).
Srivastava et al., "Multimodal learning with deep Boltzmann machines," In NIPS, pp. 2222-2230, 2012 (9pgs).
Vedantam et al., "CIDEr: Consensus-based image description evaluation," arXiv preprint arXiv:1411.5726, 2014 (17pgs).
Young et al., "From image descriptions to visual denotations: New similarity metrics for semantic inference over event descriptions," In ACL, pp. 479-488, 2014 (12pgs).
Chen et al., "A survey of smoothing techniques for ME models," TSAP, 8 (1):37-50, 2000 (14pgs).
Donahue et al., "DeCAF: A deep convolusional activation feature for generic visual recognition," arXiv preprint arXiv:1310.1531, 2013 (10pgs).
Gupta et al., "Choosing Linguistics over Vision to Describe Images,"In ICONIP, 2011 (7pgs).
Ren et al, Image Question Answering: A Visual Semantic Embedding Model and a New Dataset, May 8, 2015, https://arxiv.org/pdf/1505.0207 4v1.pdf (Year: 2015). (10pgs).
Non-Final Office Action dated Jan. 25, 2019, in U.S. Appl. No. 15/166,177. (15pgs).
Response filed Apr. 22, 2019, in U.S. Appl. No. 15/166,177. (17pgs).
Lin et al., "Automatic evaluation of machine translation quality using longest commmon subsequence and skip-bigram statistics," In ACL, p. 605, 2004 (8pgs).
Mikolov et al., "Efficient estimation of word representations in vector space," arXiv preprint arXiv:1301.3781, 2013 (12pgs).
Kiros et al., "Unifying visual-semantic embedings with multimodal neural language models," arXin preprint arXiv:1411.2539, 2014a (13pgs).
Mao et al., "Explain Images with Multimodal Recurrent Neural Networks," <URL:http://arxiv.org/pdf/1410.1090v1.pdf, Oct. 4, 2014 (9pgs).
Mao et al., "Deep Captiioning with Multimodal Recurrent Neural Networks (M-RNN)," <URL:https://arxiv.org/pdf/1412.6632.pdf, Jun. 11, 2015 (17 pgs).
Agrawal et al., "VQA: Visual Question Answering," arXiv:1505.00468v6 [cs.CL] Apr. 20, 2016, pp. 1-23 (23pgs).
Antol et al., "Zero-Shot Learning via Visual Abstraction," In ECCV, pp. 1-16, 2014 (16pgs).
Bengio et al., "Learning Deep Architectures for AI," Foundations and Trends in Machine Learning, 2(1):1-71, 2009 (71pgs).
Bloom, "How children learn the meanings of words," The MIT press, printed Jun. 13, 2016, https://mitpress.mit.edu/books/how-children-learn=meanings-words, 2002 (2pgs).
Carey et al., "Acquiring a single new word," retrieved on Jun. 14, 2016, Papers and Reports on Child Language Development, 15:17-29, Aug. 1978 (14pgs).
Chen et al., "Microsoft COCO Captions: Data collection and evaluation server," arXiv:1504.00325v2 [cs.CV] Apr. 3, 2015, pp. 1-7 (7pgs).

(56) References Cited

OTHER PUBLICATIONS

Chen et al., "Learning a recurrent visual representation for image caption generation," arXiv preprint arXiv:1411.5654v1, Nov. 20, 2014 (10pgs).
Cho et al., "Learning phrase representations using RNN encoder-decoder for statistical machine translation," arXiv preprint arXiv:1406.1078v3 [cs.CL], Sep. 3, 2014 (15pgs).
Devlin et al., "Exploring nearest neighbor approaches for image captioning," arXiv preprint arXiv:1505.04467v1 [cs.CV] May 17, 2015 (6pgs).
Donahue et al., "Long-term recurrent convolutional networks for visual recognition and description," arXiv preprint arXiv:1411.4389v4 [cs.CV], May 31, 2016, pp. 1-14 (14pgs).
Grubinger et al., "The IAPR TC-12 benchmark: A new evaluation resource for visual information systems," In International Workshop OntoImage, pp. 13-23, 2006 (5pgs).
Guillaumin et al., "Multiple instance metric learning from automatically labeled bags of faces," In ECCV, pp. 634-647, 2010 (14pgs).
Gupta et al., "From image annotation to image description," In ICONIP, 2012 (7pgs).
Gupta et al., "Choosing linguistics over vision to describe images," In AAAI, 2012 (32pgs).
Hochreiter et al., "Long short-term memory," Neural computation, 9(8):1735-1780, 1997 (47pgs).
Hodosh et al., "Framing image description as a ranking task: Data, models and evaluation metrics," JAIR, 47:853-899, 2013 (8pgs).
Jia et al., "Learning cross-modality similarity for multinomial data," In ICCV, pp. 2407-2414, 2011 (10pgs).
Kalchbrenner et al., "Recurrent continuous translation models," In EMNLP, pp. 1700-1709, 2013 (17pgs).
K. Barnard et al., "Matching words and pictures," JMLR, 3:1107-1135, 2003 (29pgs).
Chen et al., "Microsoft COCO captions: Data collection and evaluation server," arXiv preprint arXiv:1504.00325, 2015 (7pgs).
Chen et al., "Learning a recurrent visual representation for image caption generation," arXiv preprint arXiv:1411.5654, 2014 (10pgs).
Cho et al, "Learning phrase representations using RNN encoder-decoder for statistical machine translation," arXiv preprint arXiv:1406.1078, 2014 (15pgs).
Devlin et al., "Language models for image captioning: The quirks and what works," arXiv preprint arXiv:1505.01809, 2015 (6pgs).
Devlin, et al., "Exploring nearest neighbor approaches for image captioning," arXiv preprint arXiv:1505.04467, 2015b (6pgs).
Donahue et al., "Long-term recurrent convolutional networks for visual recognition and description," arXiv preprint arXiv:1411.4389, 2014 (13pgs).
Elman, "Finding structure in time," Cognitive science, 14(2):179-211, 1990 (33pgs).
Farhadi et al., "Every picture tells a story: Generating sentences from images," In ECCV, pp. 15-29. 2010 (14pgs).
Karpathy et al., "Deep visual-semantic alignments for generating image descriptions," arXiv preprint arXiv:1412.2306, 2014 (9pgs).
Karpathy et al., "Deep fragment embeddings for bidirectional image sentence mapping," In arXiv:1406.5679, 2014 (13pgs).
Kiros et al., "Multimodal neural language models," In ICML, 2014b (14pgs).
Krizhevsky et al., "ImageNet classification with deep convolutional neural networks," In NIPS, pp. 1097-1105, 2012 (9pgs).
Kulkarni et al., "Baby talk: Understanding and generating image descriptions," In CVPR, 2011 (8pgs).
Kuznetsova et al., "TreeTalk: Composition and compression of trees for image descriptions," Transactions of the Assoc for Computational Linguistics, 2(10):351-362, 2014 12pgs.
Mao et al., "Explain images with multimodal recurrent neural networks," NIPS DeepLearning Workshop, 2014 (9pgs).
Mao et al., "Learning like a child: Fast novel visual concept learning from sentence descriptions of images," arXiv preprint arXiv:1504.06692, 2015 (10pgs).
Heibeck et al., "Word learning in children: An examination of fast mapping," Child development, pp. 1021-1034, 1987 (32pgs).
Hochreiter et al., "Long short-term memory," Neural computation, 9(8):1735-1780, 1997 (32pgs).
Kalchbrenner et al., "Recurrent continuous translation models," In EMNLP, pp. 1700-1709, 2013 (10pgs).
Karpathy et al., "Deep visual-semantic alignments for generating image descriptions," arXiv preprint arXiv:1412.2306, 2014 (17pgs).
Kiros et al., "Unifying visual-semantic embeddings with multimodal neural language models," arXiv preprint arXiv:1411.2539, 2014 (13pgs).
Klein et al., "Fisher vectors derived from hybrid gaussian-laplacian mixture models for image annotation," arXiv preprint arXiv:1411.7399, 2014 (12pgs).
Lake et al., "One shot learning of simple visual concepts," In Cognitive Science, 172, 2011 (9pgs).
Lavie et al., "Meteor: An automatic metric for mt evaluation with high levels of correlation with human judgements,"In Workshop-Statistical Machine Translation,pp. 228-231,2007.
Mikolov et al., "Extensions of recurrent neural network language model," In ICASSP, pp. 5528-5531, 2011 (17pgs).
Mnih et al., "Three new graphical models for statistical language modelling," In ICML, pp. 641-648. ACM, 2007 (8pgs).
Nair et al., "Rectified linear units improve restricted Boltzmann machines," In ICML, pp. 807-814, 2010 (8pgs).
Rashtchian et al., "Collecting image annotations using Amazon's mechanical turk." In NAACL-HLT workshop 2010, pp. 139-147, 2010 (9pgs).
Rumelhart et al., "Learning representations by back-propagating errors." Cognitive modeling, 1988 (4pgs).
Notice of Allowance and Fees Due dated May 13, 2019, in U.S. Appl. No. 15/166,177. (9 pgs).

\* cited by examiner

500

Minimize a cost function of a model, the cost function representing an average log-likelihood of words given their context words and corresponding images in training sentences plus a regularization term — 505

Given calculated cost data, use backpropagation to learn the model parameters — 510

| | Image 1 | Image 2 | Image 3 | Image 4 | Image 5 |
|---|---|---|---|---|---|
| Model-based | a window with a window | a street with a lot of cars and a bus | a group of people playing frisbee in a park | a man in a blue shirt is riding a horse | a woman is holding a child |
| Deep-MVCS | a cat standing in front of a window | a motorcycle parked in a parking lot with a car in the background | a group of quidditch players playing quidditch on a field | a t-rex is standing in a room with a man | a woman is holding a suitcase in her hand |

Table 4

| Evaluation Metrics | | | All test | | | | | | NewObj-Cat | | | NC test | | | | | | Base test | | |
|---|---|---|---|---|---|---|---|---|---|---|---|---|---|---|---|---|---|---|---|---|
| | f | B-1 | B-2 | B-3 | B-4 | METEOR | B-1 | B-2 | B-3 | B-4 | METEOR | B-1 | B-2 | B-3 | B-4 | METEOR |
| Model-retrain | 0.866 | 0.689 | 0.531 | 0.391 | 0.291 | 0.228 | 0.686 | 0.549 | 0.403 | 0.305 | 0.227 | 0.683 | 0.513 | 0.379 | 0.277 | 0.229 |
| Model-base | 0.680 | 0.645 | 0.474 | 0.339 | 0.247 | 0.201 | 0.607 | 0.436 | 0.303 | 0.217 | 0.175 | 0.683 | 0.511 | 0.375 | 0.277 | 0.227 |
| Model-word2vec | 0.183 | 0.642 | 0.471 | 0.341 | 0.255 | 0.209 | 0.640 | 0.432 | 0.307 | 0.217 | 0.176 | 0.674 | 0.500 | 0.375 | 0.273 | 0.221 |
| Deep-NVCS | 0.873 | 0.682 | 0.521 | 0.382 | 0.286 | 0.224 | 0.684 | 0.534 | 0.392 | 0.299 | 0.223 | 0.680 | 0.508 | 0.372 | 0.274 | 0.223 |
| Deep-NVCS-1:1inc | 0.881 | 0.683 | 0.523 | 0.385 | 0.288 | 0.226 | 0.686 | 0.533 | 0.398 | 0.303 | 0.226 | 0.679 | 0.507 | 0.371 | 0.273 | 0.223 |
|  |  |  |  |  | NewObj-Motor |  |  |  |  |  |  |  |  |  |  |  |
| Model-retrain | 0.797 | 0.697 | 0.526 | 0.386 | 0.284 | 0.240 | 0.687 | 0.512 | 0.368 | 0.263 | 0.244 | 0.797 | 0.539 | 0.404 | 0.305 | 0.236 |
| Model-base | 0.680 | 0.646 | 0.460 | 0.327 | 0.235 | 0.218 | 0.586 | 0.381 | 0.235 | 0.160 | 0.308 | 0.705 | 0.536 | 0.401 | 0.301 | 0.235 |
| Model-word2vec | 0.279 | 0.663 | 0.476 | 0.338 | 0.245 | 0.226 | 0.624 | 0.403 | 0.279 | 0.183 | 0.223 | 0.701 | 0.530 | 0.397 | 0.303 | 0.229 |
| Deep-NVCS | 0.784 | 0.688 | 0.513 | 0.373 | 0.276 | 0.236 | 0.677 | 0.494 | 0.349 | 0.252 | 0.241 | 0.698 | 0.530 | 0.398 | 0.296 | 0.231 |
| Deep-NVCS-1:1inc | 0.790 | 0.687 | 0.513 | 0.374 | 0.280 | 0.233 | 0.672 | 0.492 | 0.347 | 0.256 | 0.237 | 0.703 | 0.532 | 0.401 | 0.303 | 0.234 |

FIG. 13

SYSTEMS AND METHODS FOR FAST NOVEL VISUAL CONCEPT LEARNING FROM SENTENCE DESCRIPTIONS OF IMAGES

CROSS-REFERENCE TO RELATED APPLICATION

This application claims the priority benefit under 35 USC § 119(e) to commonly assigned and co-pending U.S. Patent Application No. 62/289,088, filed on 29 Jan. 2016, entitled "SYSTEMS AND METHODS FOR FAST NOVEL VISUAL CONCEPT LEARNING FROM SENTENCE DESCRIPTIONS OF IMAGES," and listing Junhua Mao, Wei Xu, Yi Yang, Jiang Wang, and Zhiheng Huang as inventors. The aforementioned patent document is incorporated by reference herein in its entirety.

This application is a continuation-in-part of, and claims the priority benefit under 35 USC § 120 to, commonly assigned and co-pending U.S. patent application Ser. No. 15/166,177, filed on 26 May 2016, entitled "INTELLIGENT IMAGE CAPTIONING," and listing Junhua Mao, Wei Xu, Yi Yang, Jiang Wang, and Zhiheng Huang as inventors, which claims the priority benefit under 35 USC § 119(e) to U.S. Patent Application No. 62/236,784, filed on 2 Oct. 2015, entitled "INTELLIGENT IMAGE CAPTIONING," and listing Junhua Mao, Wei Xu, Yi Yang, Jiang Wang, and Zhiheng Huang as inventors. Each of the aforementioned patent documents is incorporated by reference herein in its entirety.

TECHNICAL FIELD

The present disclosure relates generally to systems and methods for computer learning that can provide improved computer performance, features, and uses.

BACKGROUND

Computing devices play an ever increasingly complex and integral role in people's lives. Interestingly, even though computing devices perform substantially more complex and varied tasks, the skill level needed for lay people to use such computing devices tends to become simpler—thereby making is more accessible to a general population. To achieve computing devices that provide complex services but do so in an accessible manner requires the computing devices to become more intelligence. Increasing the ability of a computing device to learn, allows it to provide more robust services and provides easier, more intuitive ways for people to interface with the computing device.

Accordingly, what is needed are systems and methods that allow computing devices to learn new concepts, which may then be used to provide additional services to users, such as, by way of example, improved searching and interfaces for computing devices.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 5 depicts a method for training an image caption model according to embodiments of the present disclosure.

FIG. 12 shows some sample generated sentence descriptions of the base model and a Deep-NVCS model according to embodiments of the present document.

FIG. 13 depicts Table 4, which show the performance of embodiments of Deep-NVCS models compared to strong baselines on the NewObj-Cat and NewObj-Motor datasets, according to embodiments of the present document.

DETAILED DESCRIPTION OF THE PREFERRED EMBODIMENTS

Figure 1:
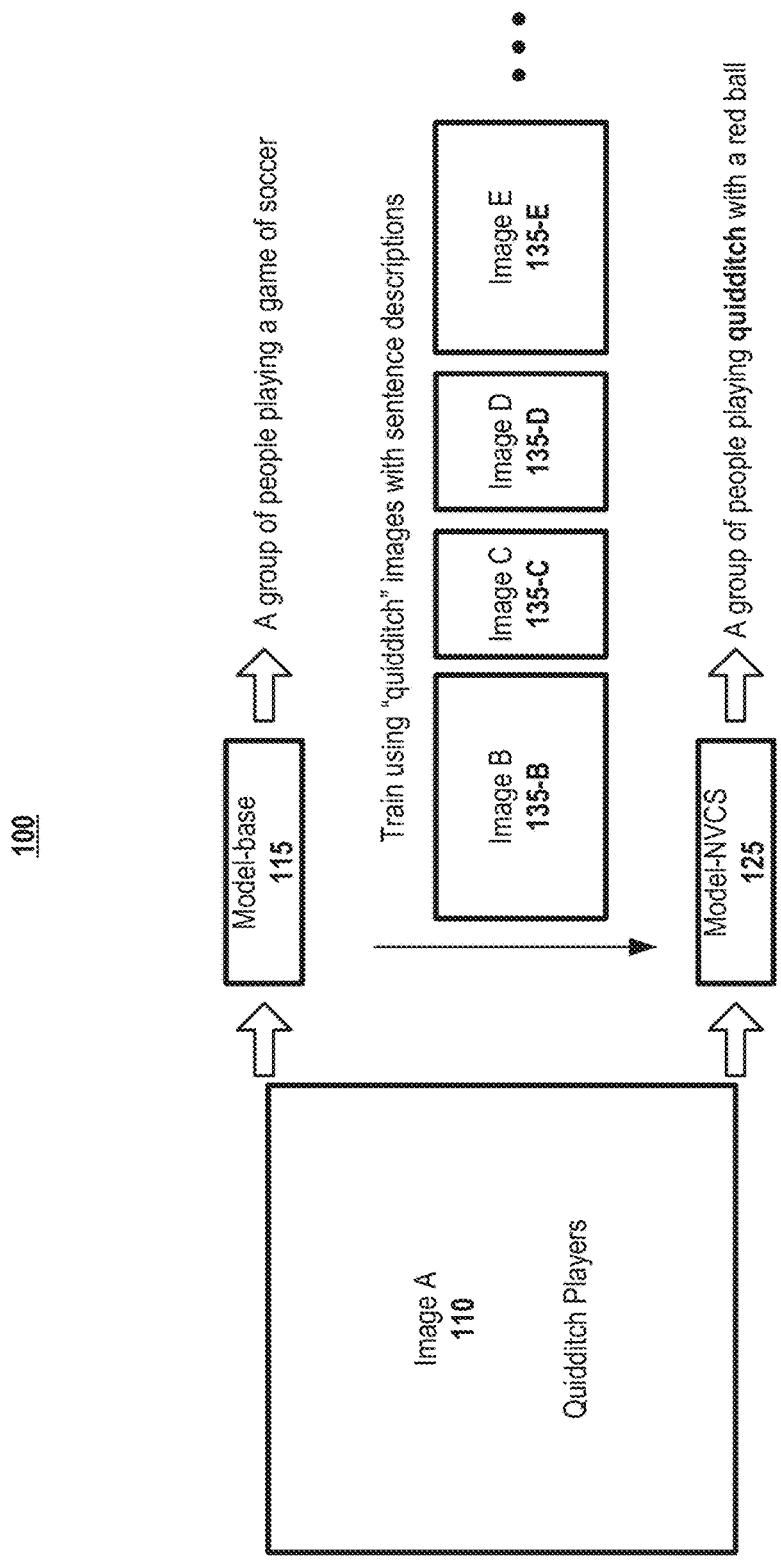
FIG. 1 depicts an illustration of novel visual concept learning from sentences according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Recognizing, learning, and using novel concepts is one of the most important cognitive functions of humans. When people are very young, they learn new concepts by observing the visual world and listening to the sentence descriptions of their parents. The process tends to be slow at the beginning, but gets much faster after people accumulate enough learned concepts. In particular, it is known that children can form quick and rough hypotheses about the meaning of new words in a sentence based on their knowledge of previous learned words, associate these words to the objects or their properties, and describe novel concepts using sentences with the new words. This phenomenon has been researched for over 30 years by the psychologists and linguists who study the process of word learning.

For the computer vision field, several methods are proposed to handle the problem of learning new categories of objects from a handful of examples. This task is important in practice because sometimes there is not have enough data for novel concepts and hence need to transfer knowledge from previously learned categories. Moreover, it is not preferred to retrain the whole model every time a few images with novel concepts are added, especially when the amount of data or model parameters is very big.

However, these previous methods concentrate on learning classifiers, or mappings, between single words (e.g., a novel object category) and images. The authors of this patent document are unaware of any computer vision studies into the task of learning novel visual concepts from a few sentences and then using these concepts to describe new images—a task that children seem to do effortlessly. The process, the process of learning novel visual concepts from a few sentences, may be referred to herein the Novel Visual Concept learning from Sentences (NVCS) task. FIG. 1 depicts an illustration of a model for novel visual concept learning from sentences according to embodiments of the present document.

As shown in FIG. 1, a model (i.e., model-base 115) is trained with images that do not contain a certain concept, in this case "quidditch." Quidditch is a sport that appeared in the "Harry Potter" series of novels. Fan of the book series created a real-life version of the sport played with a ball and teams of people holding brooms, which may be depicted in Image A 110. Using a few "quidditch" images (e.g., Images B-E 135) with sentence descriptions, embodiments of the model 125 are able to learn that "quidditch" is played by people with a ball. Presented herein are embodiments of novel frameworks to address the NVCS task. In embodiments, the framework starts with a model that has already been trained with a large amount of visual concepts. In embodiments, the model is configured to enlarge its word dictionary to describe the novel concepts using a few examples and without extensive retraining. In embodiments, the models need not be retrained from scratch on all of the data (i.e., all the previously learned concepts and the novel concepts). Also presented herein are three datasets for the NVCS task to validate embodiments of the models.

Embodiments of the methodology use a base model for image captioning, which may be adapted to perform the NVCS task. In embodiments, a Multimodal Recurrent Neural Networks (m-RNN) model, which performs at the state of the art, may be used as a base model. Examples of the m-RNN model are described in U.S. patent application Ser. No. 15/166,177 and U.S. Patent Application No. 62/236,784—each of which is incorporated by reference herein in its entirety. It should be noted that, in embodiments, most of the current image captioning models may be used as the base model. It should also be noted that, in embodiments, several changes are made to the model structure of m-RNN partly motivated by the desire to avoid overfitting, which is a particular danger for NVCS because learning from a few new images. Furthermore, it should be noted that these changes also improve performance on the original image captioning task. In embodiments, a transposed weight sharing (TWS) strategy (motivated by auto-encoders) which reduces, by a factor of one half, the number of model parameters that need to be learned may be introduced. This allows the ability to increase the dimension of the word-embedding and multimodal layers, without overfitting the data, yielding a richer word and multimodal dense representation. In embodiments, this image captioning model may be trained on a large image dataset with sentence descriptions. This, in embodiments, is the base model which may be adapted for the NVCS task.

Next, the task of learning the new concepts from a small new set of data that contains these concepts may be addressed. There are at least two main difficulties. Firstly, the weights for the previously learned concepts may be disturbed by the new concepts. Although, in embodiments, this can be solved by fixing these weights. Secondly, learning the new concepts from positive examples may introduce bias. Intuitively, embodiments of a model will assign a baseline probability for each word, which is roughly proportional to the frequency of the words in the sentences. When the model is trained on new data, the baseline probabilities of the new words may be unreliably high.

According, in embodiments, a strategy may be employed that addresses this problem by fixing the baseline probability of the new words.

Three datasets were constructed to validate embodiments of the present disclosure, which involved new concepts of man-made objects, animals, and activities. The first two datasets were derived from the MS-COCO (Microsoft Common Objects in Context) dataset. The third new dataset was constructed by adding three uncommon concepts which do not occur in MS-COCO or other standard datasets. These concepts are: quidditch, Tyrannosaurus rex (t-rex), and samisen (see Section E). The experiments show that training according embodiments of the current disclosure on only a few examples of the new concepts gives as good performance as retraining an entire model on all the examples.

B. Related Work

Deep neural network. Recently, there have been dramatic progress in deep neural networks for natural language and computer vision. For natural language, Recurrent Neural Networks (RNNs) and Long-Short Term Memories (LSTMs) achieve the state-of-the-art performance for many natural language processing (NLP) tasks such as machine translation and speech recognition. For computer vision, deep Convolutional Neural Networks (CNN) outperform previous methods by a large margin for the tasks of object classification and detection. The success of these methods for language and vision motivate their use for multimodal learning tasks (e.g., image captioning and sentence-image retrieval).

Multimodal learning of language and vision. The methods of image-sentence retrieval, image description generation, and visual question-answering have developed very fast in recent years. Recent works of image captioning adopt an RNN-CNN framework that optimizes the log-likelihood of the caption given the image, and train the networks in an end-to-end way. An exception incorporates visual detectors, language models, and multimodal similarity models in a high-performing pipeline. The evaluation metrics of the image captioning task is also discussed. All of these image captioning methods use a pre-specified and fixed-word dictionary, and train their model on a large dataset. Embodiments herein may be directly applied to any captioning models that adopt an RNN-CNN framework, and the strategy disclosed herein to avoid overfitting is useful for most of the models in the novel visual concept learning task.

Zero-shot and one-shot learning. For zero-shot learning, the task is to associate dense word vectors or attributes with image features. The dense word vectors in some prior approaches are pre-trained from a large amount of text corpus and the word semantic representation is captured from co-occurrence with other words. One approach developed this idea by only showing the novel words a few times. In addition, another approach adopted auto-encoders with attribute representations to learn new class labels, and yet another approach proposed a method that scales to large datasets using label embeddings.

Another related task is one-shot learning task of new categories. They learn new objects from only a few examples. However, these work only consider words or attributes instead of sentences and so their learning target is different from that of the task addressed in this patent document.

C. Embodiments of Image Captioning Models

In embodiments, image captioning is used as the base model, which will be adapted in the NVCS task. In embodiments, the base model may be based on a Multimodal Recurrent Neural Networks (m-RNN) model as described in U.S. patent application Ser. No. 15/166,177 and U.S. Patent Application No. 62/236,784—each of which is incorporated by reference herein in its entirety. An example architecture is shown in FIG. 2.

Figure 2:
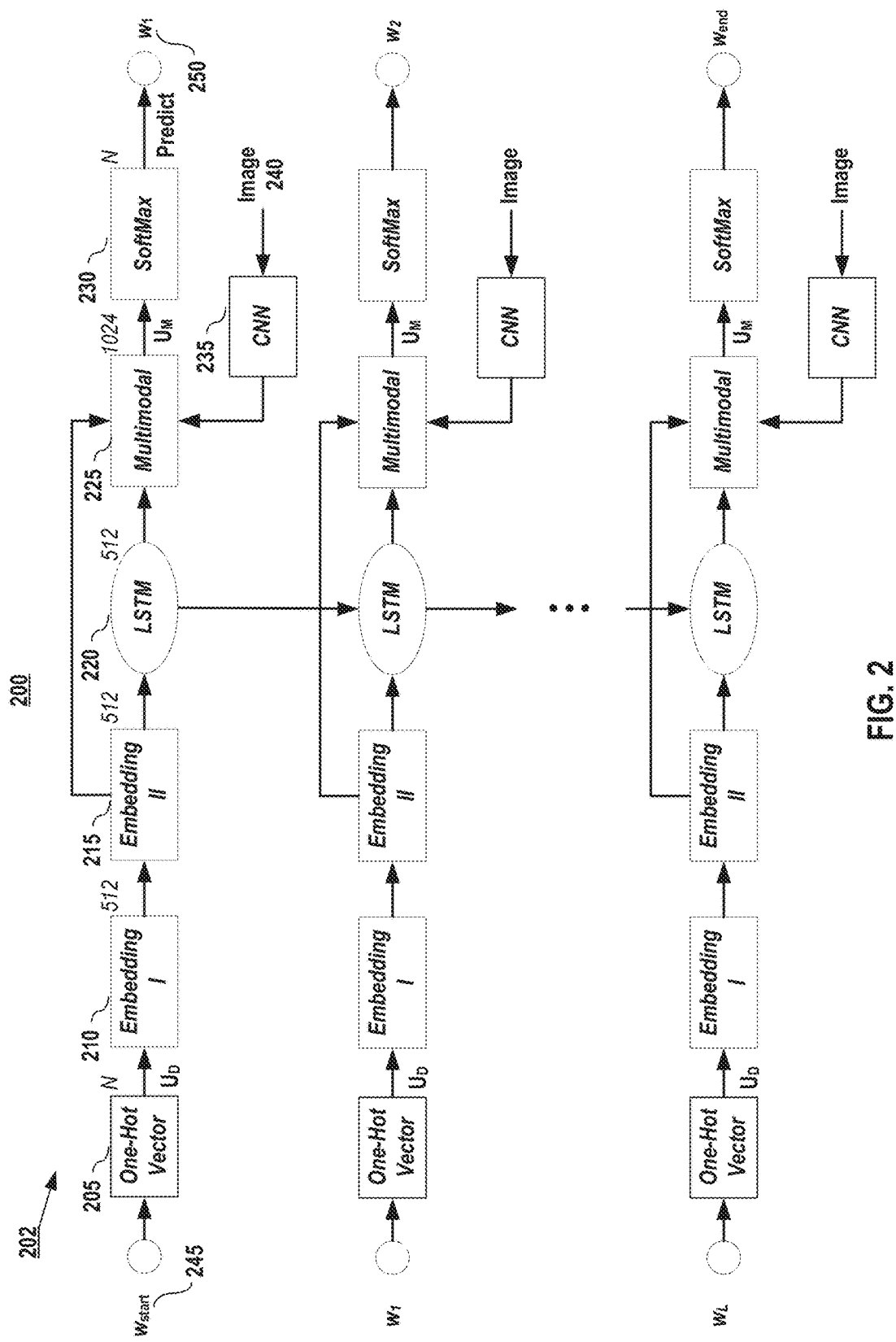
FIG. 2 depicts an example of an image captioning model according to embodiments of the present document.
Figure 3:
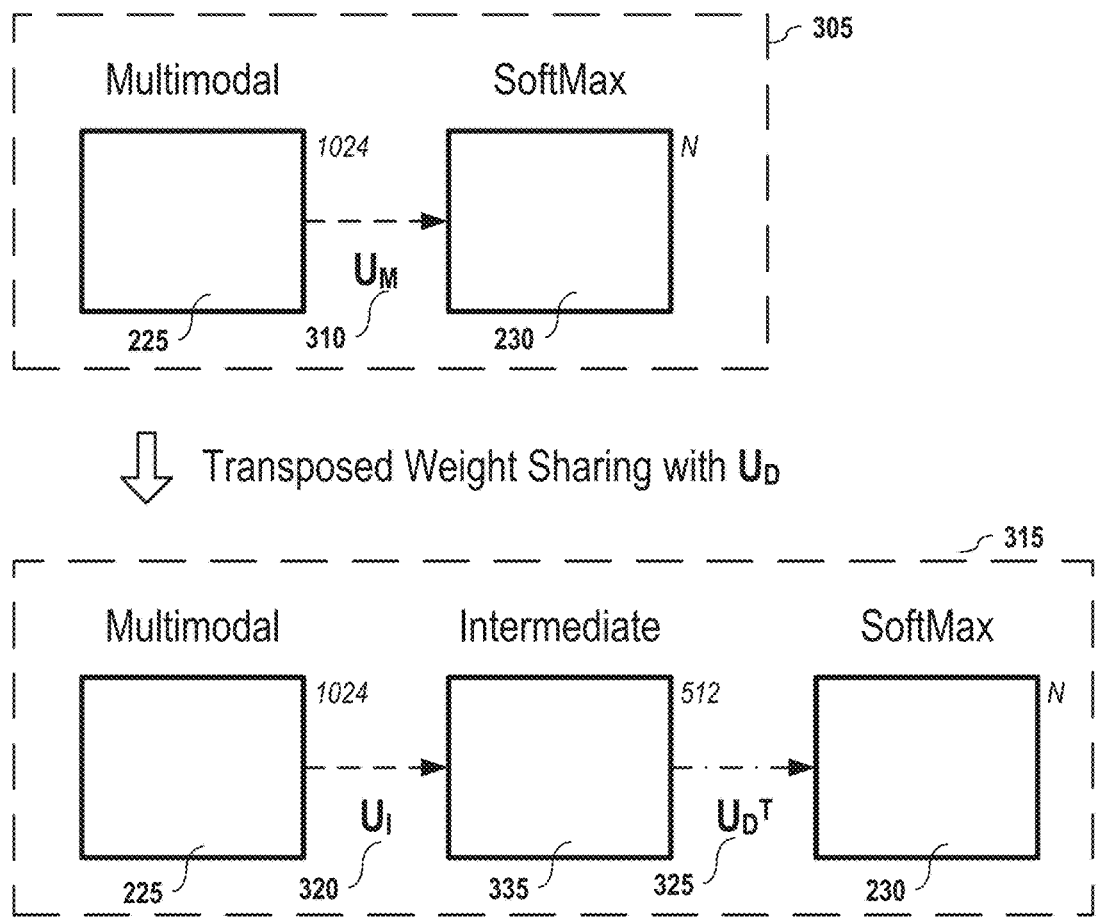
FIG. 3 graphically depicts transposed weight sharing between weight matrices $U_D$ and $U_M$, according to embodiments of the present document.

FIG. 2 depicts an example of an image captioning model according to embodiments of the present disclosure. In embodiments, for each word in a sentence, the model 202 takes the current word index 245 and the image 240 as inputs, and outputs the next word index 250. In embodiments, the weights are shared across the sub-models for the words in a sentence. The number on the top right of each layer (in italics) denotes its dimension for the depicted embodiment. As in the m-RNN model, a start sign, $w_{start}$, and an end sign, $w_{end}$, was added to each training sentence. FIG. 3 depicts a transposed weight sharing of $U_D$ and $U_M$ according to embodiments of the present document, which is discussed in more detail (below).

In embodiments, two main modifications of the base m-RNN architecture are made to make it more suitable for the NVCS task which, as a side effect, also improves performance on the original image captioning task. Firstly, in embodiments, a transposed weight sharing strategy is employed, which significantly reduces the number of parameters in the model (see section C.2). Secondly, in embodiments, the recurrent layer in is replaced by a Long-Short Term Memory (LSTM) layer 220. LSTM is a recurrent neural network, which is designed to solve the gradient explosion and vanishing problems. The framework of the model is introduced in section C.1, and the details of the transposed weight sharing strategy are provided in section C.2.

1. Embodiments of Model Architectures

As shown in the embodiment depicted in FIG. 2, the input of the model for each word in a sentence is the index of the current word in the word dictionary as well as the image 240. In embodiments, this index may be represented as a one-hot vector 205 (e.g., a binary vector with only one non-zero element indicating the index). The output is the index of the next word. In embodiments, the model comprises three components: a language component, a vision component, and a multimodal component. In embodiments, the language component comprises two word embedding layers 210 and 215 and a LSTM layer 220. It maps the index of the word in the dictionary into a semantic dense word embedding space and stores the word context information in the LSTM layer. In embodiments, the vision component contains a 16-layer deep convolutional neural network (CNN) 235, which may be pre-trained on the ImageNet classification task. In embodiments, the final SoftMax layer of the deep CNN is removed and the top fully connected layer (which may be a 4096-dimensional layer) is connected to the model. In embodiments, the activation of this 4096-dimensional layer can be treated as image features that contain rich visual attributes for objects and scenes. In embodiments, a multimodal component 225 contains a one-layer representation where the information from the language part and the vision part merge together. In embodiments, a SoftMax layer 230 may be built after the multimodal layer 225 to predict the index of the next word (e.g., $w_1$ 250). And, in embodiments, the weights are shared across the sub-models of the words in a sentence. As previously mentioned, in embodiments, a start sign, $w_{start}$, and an end sign, $w_{end}$, may be added to each training sentence. In the testing/using stage for image captioning, the start sign, $w_{start}$, may be inputted into the model and the K best words with maximum probabilities may be picked according to the SoftMax layer. This process may be repeated until the model generates the end sign, $w_{end}$.

Figure 4:
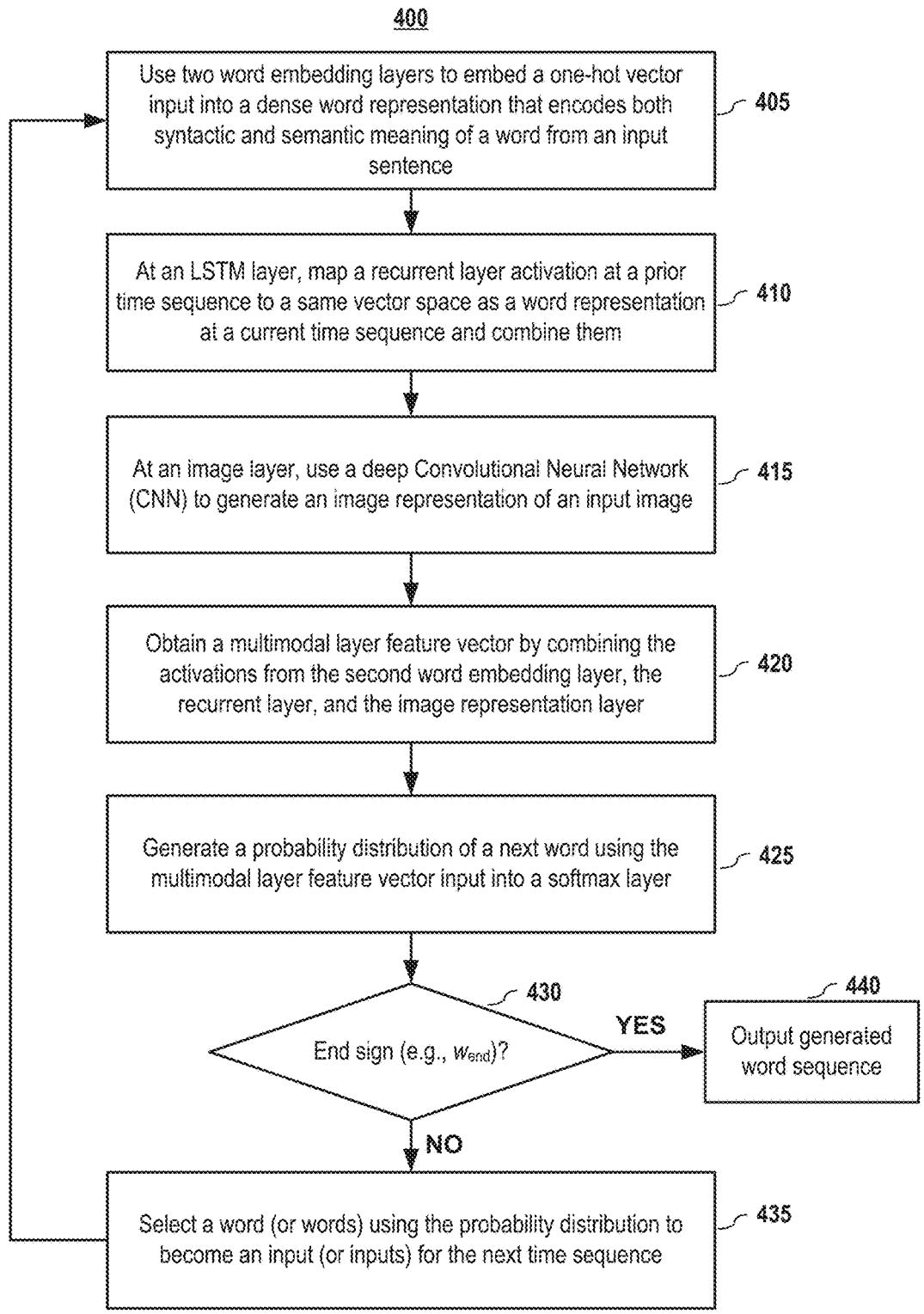
FIG. 4 depicts an example method flow for an image caption model according to embodiments of the current disclosure.

FIG. 4 depicts an example method flow for a multimodal network according to embodiments of the current disclosure. In embodiments, the two word embedding layers 210, 215 embed (405) a one-hot input 205 into a dense word representation. It encodes both the syntactic and semantic meaning of the words. In embodiments, the semantically relevant words may be found by calculating the Euclidean distance between two dense word vectors in embedding layers. Most of the sentence-image multimodal models use pre-computed word embedding vectors as the initialization of their model. In contrast, in embodiments, the word embedding layers are randomly initialized and these embedding layers are trained from the training data. This random initialization is sufficient for the model architecture to generate state-of-the-art results. In embodiments, the activation of the word embedding layer II 215 may be treated as the final word representation, which is one of the three direct inputs of the multimodal layer 225.

After the two word embedding layers, in embodiments, there is a LSTM layer 220. At the LSTM layer, the recurrent layer activation at a prior time sequence is mapped (410) to a same vector space as a word representation at a current time sequence and combine them.

In embodiments, after the LSTM layer, a multimodal layer 225 connects the language model part and the vision part of the multimodal model by taking three inputs: the word-embedding layer II 215, the recurrent layer 220, and the image representation 235. At the image layer, a deep Convolutional Neural Network (CNN) generates (415) an image representation of an input image 240. The activation of the three layers is, in embodiments, mapped to the same multimodal feature space and they are added (420) together to obtain the activation of the multimodal layer:

$$m(t)=g_2(V_w \cdot w(t)+V_r \cdot r(t)+V_I \cdot I);$$

where "+" denotes element-wise addition, m denotes the multimodal layer feature vector, I denotes the image feature. $g_2(\cdot)$ is the element-wise scaled hyperbolic tangent function:

$$g_2(x)=1.7159 \cdot \tan h(\tfrac{2}{3}x)$$

This function forces the gradients into the most non-linear value range and leads to a faster training process than the basic hyperbolic tangent function.

In embodiments, a SoftMax layer generates (425) the probability distribution of the next word. In embodiments, the dimension of this layer is the vocabulary size, which may be different for different datasets.

In embodiments, unless an end sign is generated (e.g., $w_{end}$), one or more words, based upon probability, may be selected (435) as an input (or inputs) for the next time sequence. Alternatively, in embodiments, if an end sign is generated (430), the generated word sentence is output (440).

In embodiments, to train embodiments of the m-RNN model, a log-likelihood cost function may be used, and it may be related to the Perplexity of the sentences in the training set given their corresponding images. Perplexity is a standard measure for evaluating language model. The perplexity for one word sequence (i.e., a sentence) $w_{1:L}$ is calculated as follows:

$$\log_2 \mathcal{PPL}(w_{1:L} \mid I) = -\frac{1}{L}\sum_{n=1}^{L}\log_2 P(w_n \mid w_{1:n-1}, I)$$

where L is the length of the word sequence, $\mathcal{PPL}(w_{1:L}|I)$ denotes the perplexity of the sentence $w_{1:L}$ given the image I. $P(w_n|w_{1:n-1},I)$ is the probability of generating the word $w_n$ given I and previous words $w_{1:n-1}$. It corresponds to the activation of the SoftMax layer in embodiments of the model.

FIG. 5 depicts a method for training a multimodal Recurrent Neural Network model according to embodiments of the present disclosure. The cost function of embodiments of the model may be the average log-likelihood of the words given their context words and corresponding images in the training sentences plus a regularization term. In embodiments, it may be calculated by the perplexity:

$$C = \frac{1}{N}\sum_{i=1}^{N_s} L_i \cdot \log_2 \mathcal{PPL}(w_{1:L_i}^{(i)} \mid I^{(i)}) + \lambda_\theta \cdot \|\theta\|_2^2$$

where $N_s$ and N denote the number of sentences and the number of words in the training set, receptively; $L_i$ denotes the length of $i^{th}$ sentences, and $\theta$ represents the model parameters.

In embodiments, the training objective is to minimize (505) this cost function, which is equivalent to maximize the probability of generating the sentences in the training set using the model. In embodiments, the cost function is differentiable and backpropagation is used (510) to learn the model parameters.

2. Transposed Weight Sharing (TWS)

For an embodiment of the original m-RNN model, most of the weights (i.e., about 98.49%) are contained in the following two weight matrices: $U_D \in \mathbb{R}^{512 \times N}$ and $U_M \in \mathbb{R}^{N \times 1024}$ where N represents the size of the word dictionary.

In embodiments, the weight matrix $U_D$ between the one-hot layer and first word embedding layer is used to compute the input of the first word embedding layer w(t):

$$w(t)=f(U_D h(t)) \qquad (1)$$

where f(.) is an element-wise non-linear function, $h(t) \in \mathbb{R}^{N \times 1}$ is the one-hot vector of the current word. Note that it is fast to calculate Equation 1 because there is only one non-zero element in h(t). In practice, the full matrix multiplication operation need not be calculated since only one column of $U_D$ is used for each word in the forward and backward propagation.

In embodiments, the weight matrix $U_M$ between the multimodal layer and the SoftMax layer is used to compute the activation of the SoftMax layer y(t):

$$y(t)=g(U_M m(t)+b) \qquad (2)$$

where m(t) is the activation of the multimodal layer and g(.) is the SoftMax non-linear function.

Intuitively, the role of the weight matrix $U_D$ in Equation 1 is to encode the one-hot vector h(t) into a dense semantic vector w(t). The role of the weight matrix $U_M$ in Equation 2 is to decode the dense semantic vector m(t) back to a pseudo one-hot vector y(t) with the help of the SoftMax function, which is very similar to the inverse operation of Equation 1. The difference is that m(t) is in the dense multimodal semantic space while w(t) is in the dense word semantic space.

Figure 6:
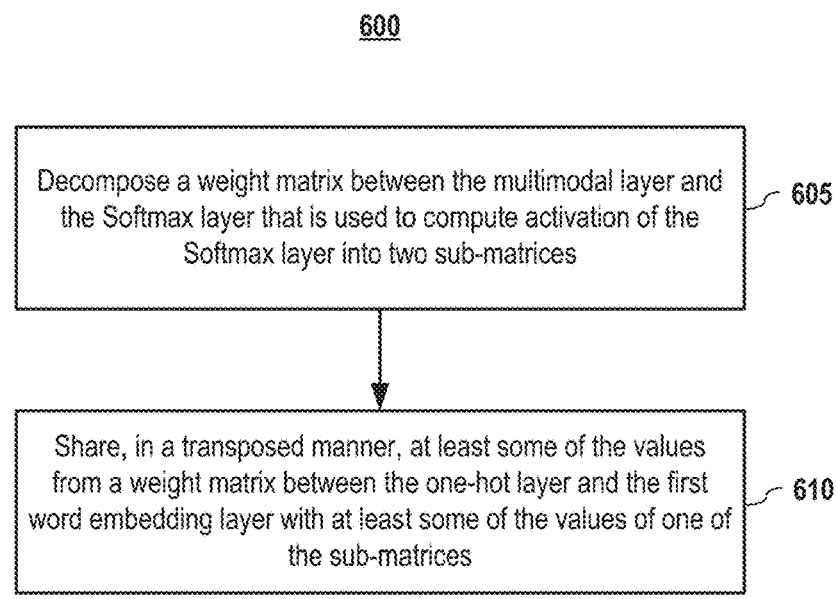
FIG. 6 depicts a method for transposed weight sharing for an image caption model according to embodiments of the present disclosure.

FIG. 6 depicts a method for transposed weight sharing for an image caption model according to embodiments of the present disclosure. In embodiments, to reduce the number of the parameters, $U_M$ is decomposed (605) into two parts. In embodiments, the first part maps the multimodal layer activation vector to an intermediate vector in the word semantic space, and the second part maps the intermediate vector to the pseudo one-hot word vector, which is the inverse operation of Equation 1. In embodiments, the sub-matrix of the second part is able to share (610) parameters with $U_D$ in a transposed manner, which is motivated by the tied weights strategy in auto-encoders for unsupervised learning tasks. Here is an example of linear decomposition: $U_M = U_D^T U_I$, where $U_I \in \mathbb{R}^{512 \times 1024}$. Equation 2 is accordingly changed to:

$$y(t) = g[U_D^T f(U_I m(t)) + b] \quad (3)$$

where f(.) is a element-wise function. If f(.) is an identity mapping function, it is equivalent to linearly decomposing $U_M$ into $U_D^T$ and $U_I$. In experiments, it was found that setting f(.) as the scaled hyperbolic tangent function leads to a slightly better performance than linear decomposition. This strategy may be viewed as adding an intermediate layer 335 with dimension 512 between the multimodal 225 and SoftMax 230 layers as shown in FIG. 3. In embodiments, the weight matrix 325 between the intermediate 335 and the SoftMax 230 layer is shared with $U_D$ in a transposed manner. This Transposed Weight Sharing (TWS) strategy enables the use a much larger dimensional word-embedding layer than embodiments of the original m-RNN model without increasing the number of parameters. The strategy also provides benefit when addressing the novel concept learning task.

D. Embodiments of the Novel Concept Learning (NVCS) Task

Consider a model that has been trained based on a large amount of images and sentences. Then, consider what should happen when the model meets with images of novel concepts whose sentence annotations contain words not in its dictionary—what should been done? It is time-consuming and potentially unnecessary to re-train the whole model from scratch using all the data. In many cases, the original training data of the model cannot be accessed. But fine-tuning the whole model using only the new data may cause severe overfitting on the new concepts and decrease the performance of the model for the originally trained ones.

To solve these problems, the following strategies that learn the new concepts with a few images without losing the accuracy on the original concepts may, in embodiments, be employed.

Figure 7:
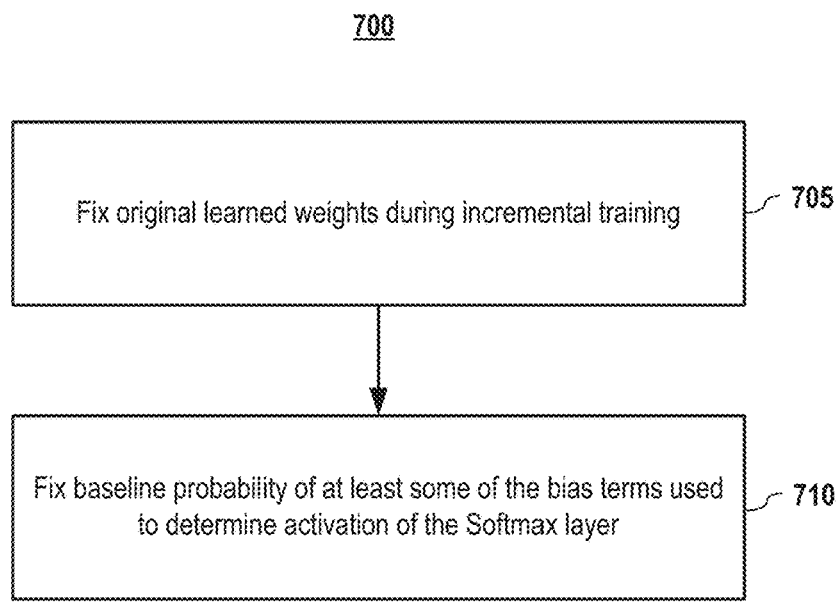
FIG. 7 depicts a method to facilitate training of novel concepts for a trained model according to embodiments of the present document.

FIG. 7 depicts a method to facilitate training of novel concepts for a trained model according to embodiments of the present document. In embodiments, learning of new concepts with just a few images may be accomplished by fixing (705) the original learned weights during incremental training, and/or by fixing (710) baseline probability of at least some of the bias terms used to determine activation of the SoftMax layer. Each of these steps are discussed in more detail, below.

1. Fixing the Originally Learned Weights

Figure 8:
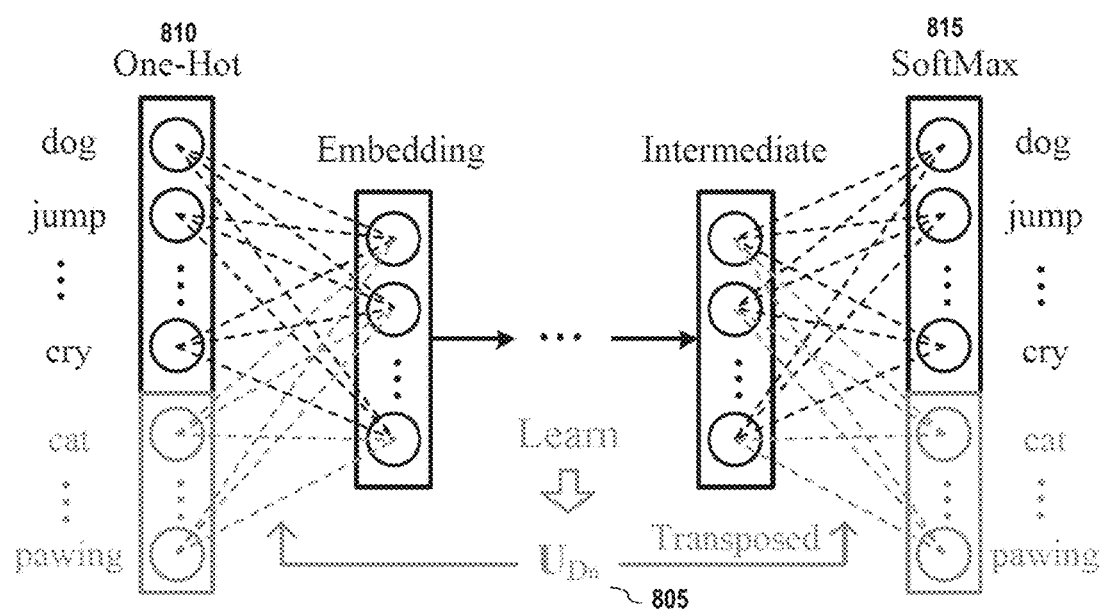
FIG. 8 graphically illustrates training of novel concepts for a trained model according to embodiments of the present document.

Under the assumption that the model has learned the weights of the original words from a large amount of data and that the amount of the data for new concepts is relatively small, it is relatively straightforward to fix the originally learned weights of the model during the incremental training. More specifically, in embodiments, the weight matrix $U_D$ can be separated into two parts: $U_D = [U_{Do}, U_{Dn}]$, where $U_{Do}$ and $U_{Dn}$ associate with the original words and the new words respectively. For example, as shown in FIG. 8, for the novel visual concept "cat", $U_{Dn}$ is associated with 29 new words, such as cat, kitten, and pawing. In embodiments, the sub-matrix $U_{Do}$ may be fixed and the submatrix $U_{Dn}$ may be updated as illustrated in FIG. 8.

FIG. 8 depicts an illustration of training novel concepts according to embodiments of the present document. In embodiments, only the sub-matrix $U_{Dn}$ (the elements 805 in FIG. 8) in $U_D$ that is connected to the node of new words in the one-hot layer 810 and the SoftMax layer 815 during the training for novel concepts is updated.

2. Fixing the Baseline Probability

In Equation 3, there is a bias term b. Intuitively, each element in b represents the tendency of the model to output the corresponding word. This term may be thought of as the baseline probability of each word. Similar to $U_D$, b may be separated into two parts: $b = [b_o, b_n]$, where $b_o$ and $b_n$ associate with the original words and the new words, respectively. If only the new data is presented to the network, the estimation of $b_n$ is unreliable. The network will tend to increase the value of $b_n$, which causes overfitting to the new data.

One of the easiest ways to solve this problem is to fix $b_n$ during the training for novel concepts, but this is not enough. Because the average activation $\bar{x}$ of the intermediate layer across all the training samples is not 0, the weight matrix $U_D$ plays a similar role to b in changing the baseline probability. To avoid this problem, in embodiments, the activation of the intermediate layer x may be centralized and the original bias term b may be turned into b' as follows:

$$y(t) = g[U_D^T(x-\bar{x}) + b']; \; b'_o = b_o + U_{Do}^T \bar{x} \quad (4)$$

After that, in embodiments, every element in $b'_n$ is set to be the average value of the elements in $b'_o$ and $b'_n$ is fixed when training on the new images. In embodiments, this strategy may be referred to as Baseline Probability Fixation (BPF).

In at least some of the experiments, a stochastic gradient descent algorithm with an initial learning rate of 0.01 was adopted and AdaDelta was used as the adaptive learning rate algorithm for both the base model and the novel concept model.

3. The Role of Language and Vision

In embodiments of the novel concept learning (NVCS) task, the sentences serve as a weak labeling of the image. In embodiments, the language part of the model (the word embedding layers and the LSTM layer) hypothesizes the basic properties (e.g., the parts of speech) of the new words and whether the new words are closely related to the content of the image. It also hypothesizes which words in the original dictionary are semantically and syntactically close to the new words. For example, suppose the model meets a new image with the sentence description "A woman is playing with a cat." Also, suppose there are images in the original data containing sentence description such as "A man is playing with a dog." Then, although the model has not seen the word "cat" before, it will hypothesize that the word "cat" and "dog" are close to each other.

In embodiments, the vision part may be pre-trained on the ImageNet classification task with 1.2 million images and 1,000 categories. It provides rich visual attributes of the objects and scenes that are useful not only for the 1,000 classification task itself, but also for other vision tasks.

Combining cues from both language and vision, embodiments of the model can effectively learn new concepts using only a few examples as demonstrated in the experiments.

E. Datasets

1. Strategies to Construct Datasets

For demonstration, embodiments used the annotations and images from the MS COCO to construct Novel Concept (NC) learning datasets. The current release of COCO contains 82,783 training images and 40,504 validation images, with object instance annotations and 5 sentence descriptions for each image. To construct the NC dataset with a specific new concept (e.g., "cat"), all images containing the object "cat" were removed according to the object annotations. A check whether there are some images left with sentences descriptions containing cat-related words was also performed. The remaining images were treated as the Base Set from which an embodiment of the base model was trained, validated, and tested. The removed images were used to construct the Novel Concept set (NC set), which was used to train, validate, and test the model for the task of novel concept learning.

2. The Novel Visual Concepts Datasets

In embodiments, three datasets were contrasted comprising five different novel visual concepts:

NewObj-Cat and NewObj-Motor. The corresponding new concepts of these two datasets are "cat" and "motorcycle" respectively. The model should learn all the related words that describe these concepts and their activities.

TABLE 1

The number of images for the three datasets.

|  | Train | NC Test | Validation |
| --- | --- | --- | --- |
| NewObj-Cat | 2840 | 1000 | 490 |
| NewObj-Motor | 1854 | 600 | 349 |
| NC-3 | 150 (50 × 3) | 120 (40 × 3) | 30 (10 × 3) |

Figure 10:
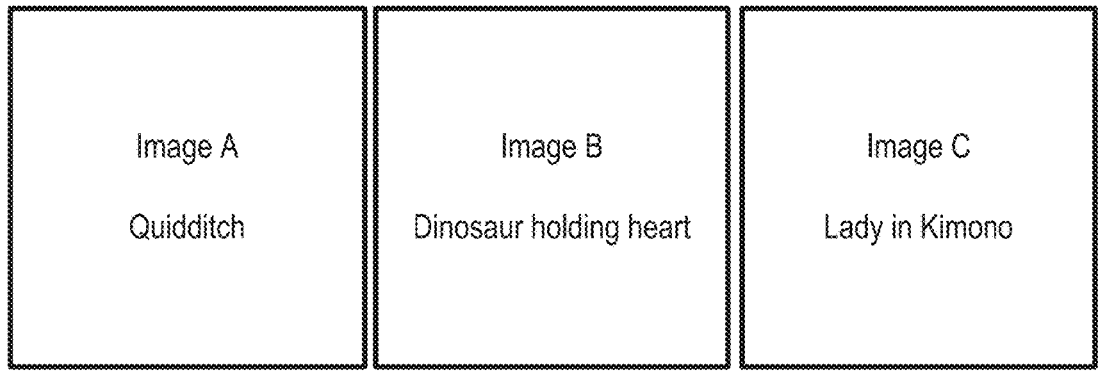
FIG. 10 depicts some sample annotations for a novel concepts dataset, according to embodiments of the present document.

NC-3 dataset. The two datasets mentioned above were derived from the MS COCO dataset. To further verify the effectiveness of embodiments of the methodology presented in this patent document, a new dataset was constructed comprising three novel concepts: "quidditch" (a recently created sport derived from "Harry Potter"), "t-rex" (a dinosaur), and "samisen" (an instrument). It contained not only object concepts (e.g., t-rex and samisen), but also activity concepts (e.g., quidditch). 100 images were labeled for each concept with 5 sentence annotations for each image. To diversify the labeled sentences for different images in the same category, the annotators were instructed to label the images with different sentences by describing the details in each image. It lead to a different style of annotation from that of the MS COCO dataset. The average length of the sentences is also 26% longer than that of the MS COCO (13.5 vs. 10.7). This dataset was constructed for two reasons. Firstly, the three concepts are not included in the 1,000 categories of the ImageNet Classification task, which was used to pre-trained the vision component of an embodiment of the model. Secondly, this dataset has richer and more diversified sentence descriptions compared to NewObj-Cat and NewObj-Motor. We denote this dataset as Novel Concept-3 dataset (NC-3). Some sample annotations are shown in FIG. 10.

Figure 9:
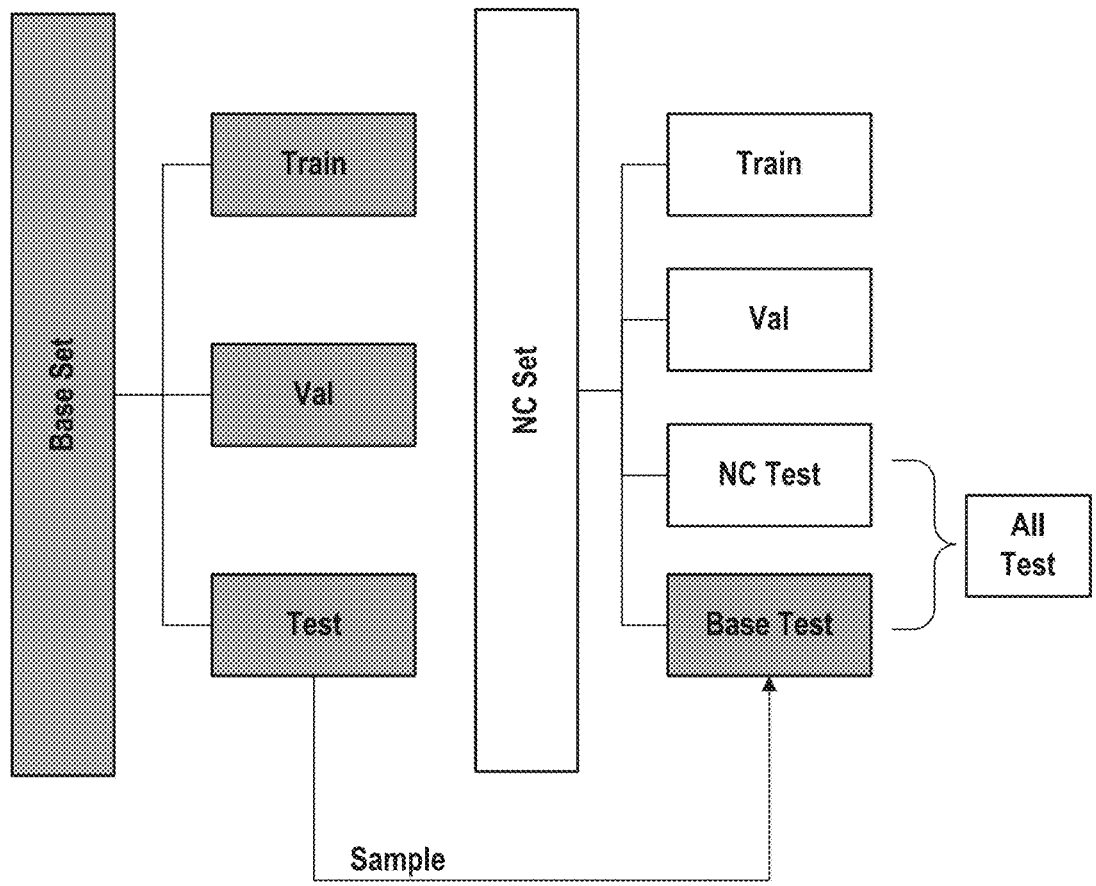
FIG. 9 depicts organization of Novel Concept (NC) datasets according to embodiments of the present document.

In embodiments, the above-three datasets were randomly separated into training, testing, and validation sets. The number of images for the three datasets are shown in Table 1. To investigate the possible overfitting issues on these datasets, in the testing stage, images were randomly selected from the testing set of the Base Set and they were treated as a separate set of testing images. For this example, the number of added images was equal to the size of the original test set (e.g., 1000 images were selected for NewObj-Cat testing set). The original new concept testing images is denoted as Novel Concept (NC) test set and the added base testing images as Base test set. A good novel visual concept learning method should perform better than the base model on NC test set and comparable on Base test set. The organization of NC datasets is illustrated in FIG. 9.

F. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Evaluation Metrics

To evaluate the output sentence descriptions for novel visual concepts, two evaluation metrics were adopted that are widely used in recent image captioning work: BLEU scores (which is discussed by K. Papineni, S. Roukos, T. Ward, and W.-J. Zhu in "BLEU: A Method For Automatic Evaluation Of Machine Translation," *ACL*, pages 311-318, 2002) (BLEU score for n-gram is denoted as B-n in the paper) and METEOR (which is discussed by A. Lavie and A. Agarwal in "METEOR: An Automatic Metric For MT Evaluation With High Levels Of Correlation With Human Judgements, *Workshop on Statistical Machine Translation*," pages 228-231, 2007), each of which is incorporated by reference herein in its entirety.

Both BLEU scores and METEOR target on evaluating the overall quality of the generated sentences. In the NVCS task, however, more of the focus was on the accuracy for the new words than the previously learned words in the sentences. Therefore, to conduct a comprehensive evaluation, the f score for the words that describe the new concepts was calculated. For example, for the cat dataset, there are 29 new words such as cat, cats, kitten, and pawing. The precision p and recall r for each new word in the dictionary ($w_n^d$) were calculated as follows:

$$p = \frac{N(w_n^d \in \mathbb{S}_{gen} \wedge w_n^d \in \mathbb{S}_{ref})}{N(w_n^d \in \mathbb{S}_{gen})};$$

$$r = \frac{N(w_n^d \in \mathbb{S}_{gen} \wedge w_n^d \in \mathbb{S}_{ref})}{N(w_n^d \in \mathbb{S}_{ref})}$$

where $\mathbb{S}_{gen}$ denotes generated sentence, $\mathbb{S}_{ref}$ denotes reference sentences, N(condition) represents number of testing images that conform to the condition. Note that p and r were calculated on the combined testing set of the NC test set and the base test set (i.e., all test).

A high r with a low p indicates that the model overfits the new data (one can always get r=1 if the new word is output every time) while a high p with a low r indicates underfitting. The equation, $$f = \frac{2}{p^{-1} + r^{-1}}$$

was used as a balanced measurement between p and r. Best f score is 1. Note that =0 if either p=0 or r=0. Compared to METEOR and BLEU, the f score showed the effectiveness of the tested embodiment of the model to learn new concepts more explicitly.

2. Effectiveness of TWS and BPF

In embodiments, an embodiment of the base model was tested with the Transposed Weight Sharing (TWS) strategy in the original image captaining task on the MS COCO and compared to an embodiment of the original m-RNN, which does not use TWS. The embodiment of the model performed better than m-RNN in this task as shown in Table 2 (below). The layer dimensions of the model was chosen so that the number of parameters matched that of an embodiment of the original m-RNN. Models with different hyper-parameters, features, or pipelines might lead to better performance. For example, some other approaches later improved their results and achieve a B-4 score of 0.302, 0.309, and 0.308 using, e.g., fine-tuned image features on COCO or consensus re-ranking, which may be considered complementary with TWS.

TABLE 2

The performance comparisons of an embodiment of a model according to the current patent document and an embodiment of the original m-RNN for the standard image captioning task.

|  | B-1 | B-2 | B-3 | B-4 | METEOR | CIDEr | ROUGE-L |
|---|---|---|---|---|---|---|---|
| m-RNN | 0.680 | 0.506 | 0.369 | 0.272 | 0.225 | 0.791 | 0.499 |
| Ours-TWS | 0.685 | 0.512 | 0.376 | 0.279 | 0.229 | 0.819 | 0.504 |

The effectiveness of embodiments of the Transposed Weight Sharing (TWS) and Baseline Probability Fixation (BPF) strategies for the novel concept learning task were also validated on the NewObj-Cat dataset. The performance of five Deep-NVCS models were compared. Their properties and performance in terms of f score for the word "cat" are summarized in Table 3 (below). "BiasFix" means that the bias term $b_n$ in Equation 3 was fixed. "Centralize" means that the intermediate layer activation x (see Equation 4) was centralized so that $U_D$ will not affect the baseline probability.

TABLE 3

Performance of Deep-NVCS Models with different novel concept learning strategies on NewObj-Cat. TWS and BPF improve the performance.

|  | BiasFix | Centralize | TWS | f |
|---|---|---|---|---|
| Deep-NVCS-UnfixedBias | x | x | ✓ | 0.851 |
| Deep-NVCS-FixedBias | ✓ | x | ✓ | 0.860 |
| Deep-NVCS-NoBPF-NoTWS | x | x | x | 0.839 |
| Deep-NVCS-BPF-NoTWS | ✓ | ✓ | x | 0.850 |
| Deep-NVCS-BPF-TWS | ✓ | ✓ | ✓ | 0.875 |

It should be noted that a 2.5% increase of performance in terms of f was obtained using TWS (Deep-NVCS-BPF-TWS vs. Deep-NVCSBPF-noTWS). It should be noted that two embodiments of the model without TWS were tried: (I) a model with multimodal layer directly connected to a SoftMax layer like an embodiment of the original m-RNN; and (II) a model with an additional intermediate layer like TWS but does not share the weights. In experiments, (I) performs slightly better than (II) so the performance of (I) is reported here. A 2.4% increase was achieved using BPF (Deep-NVCS-BPF-TWS vs. Deep-NVCS-UnfixedBias). Deep-NVCS is used to represent Deep-NVCS-BPF-TWS in short for the rest of this document.

3. Results on NewObj-Motor and NewObj-Cat a) Using all Training Samples

The performance of embodiments of the Deep-NVCS models compared to strong baselines on the NewObj-Cat and NewObj-Motor datasets are shown in Table 4, which appears in FIG. 13.

Table 4 (depicted in FIG. 13) shows the results on the NewObj-Cat and NewObj-Motor dataset using all the training samples. The Deep NVCS models outperformed the simple baselines. They achieved comparable performance with the strong baseline (i.e., Model-retrain) but only need ≤2% of the time. Model-base and Model-retrain stand for the model trained on base set (i.e., no novel concepts) and the model retrained on the combined data (i.e., all the images of base set and novel concept set) respectively. Model-word2vec is a baseline model based on word2vec. Deep-NVCS stands for the model trained only with the new concept data. Deep-NVCS-1:1Inc stands for the Deep-NVCS model trained by adding equal number of training images from the base set.

For Deep-NVCS, only the training data from the novel concept set was used. For Deep-NVCSInc1:1, training data, randomly sampled from the training set of the base set, was added. The number of added training images was the same as that of the training images for novel concepts. Model-base stands for the model trained only on the base set (no novel concept images). A baseline model, Model-word2vec, was implemented where the weights of new words ($U_{Dn}$) were calculated using a weighted sum of the weights of 10 similar concepts measured by the unsupervised learned word-embeddings from word2vec. A strong baseline, Model-retrain, was also implemented by retraining the whole model from scratch on the combined training set (training images from both the base set and the NC set).

The results show that compared to the Model-base, which is only trained on the base set, the Deep-NVCS models performed much better on the novel concept test set while reaching comparable performance on the base test set. Deep-NVCS also performed better than the Model-word2vec model. The performance of the embodiments of the Deep-NVCS models was very close to that of the strong baseline Model-retrain but needed only less than 2% of the time. This demonstrates the effectiveness of the novel concept learning strategies disclosed in this patent document. The model learns the new words for the novel concepts without disturbing the previous learned words.

The performance of Deep-NVCS is also comparable with, though slightly lower than Deep-NVCS-1:1Inc. Intuitively, if the image features can successfully capture the difference between the new concepts and the existing ones, it is sufficient to learn the new concept only from the new data. However, if the new concepts are very similar to some previously learned concepts, such as cat and dog, it may be helpful to present the data of both novel and existing concepts to make it easier for the model to find the difference.

b) Using a Few Training Samples

An embodiment of the model was also tested under the one or few-shot scenarios. Specifically, k images were randomly sampled from the training set of NewObj-Cat and NewObj-Motor, and a Deep-NVCS model was trained only on these images (k ranges from 1 to 1000). The experiments was conducted ten times and the results were averaged to avoid the randomness of the sampling.

Figure 11:
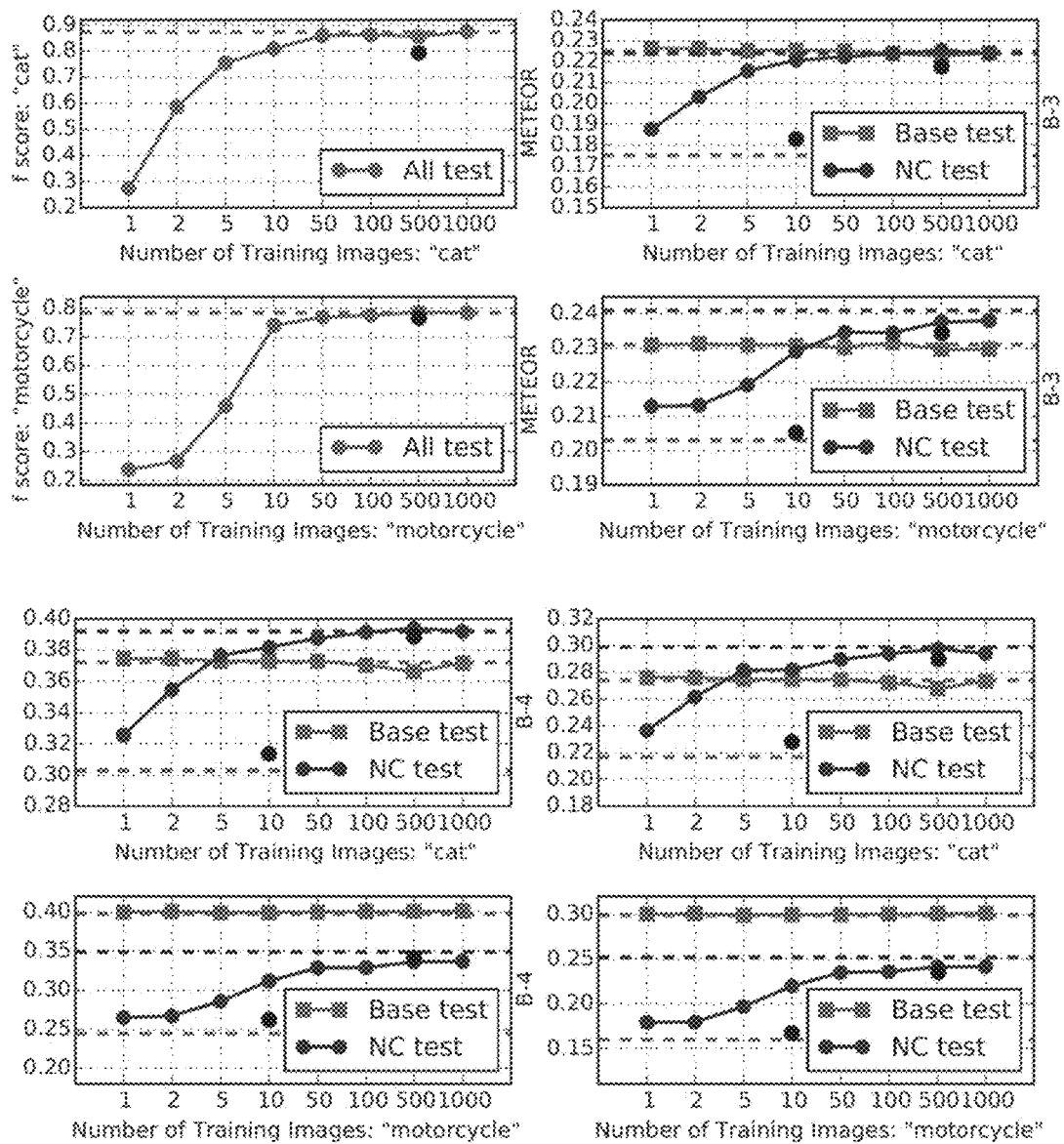
FIG. 11 shows the performance of a model with different numbers of training images, according to embodiments of the present document.

FIG. 11 shows the performance of the embodiment of the model with different number of training images, according to embodiments of the present document. The results are shown in terms of f score, METEOR, B-3, and B-4 because of space limitation. The results of B-1 and B-2 were consistent with the shown metrics. The performance of the model trained with the full NC training set in the last section is indicated by the square (Base test), circle (NC test), or All test dashed lines in FIG. 11. These lines represent the experimental upper bounds of our model under the one or few-shot scenario. The performance of the Model-base is shown by the bottom-most dashed line. It serves as an experimental lower bound. Also shown are the results of the Model-retrain for NC test with unconnected black dots in FIG. 11 trained with 10 and 500 novel concepts images.

The results show that using about 10 to 50 training images, the tested embodiment of the model achieved comparable performance with the Deep-NVCS model trained on the full novel concept training set. In addition, using about 5 training images, a nontrivial increase of performance compared to the base model was observed. The deep-NVCS according to embodiments disclosed herein also better handled the case for a few images and ran much faster than the Model-retrain.

4. Results on NC-3

It may be noted that the NC-3 dataset has three main difficulties. Firstly, the concepts have very similar counterparts in the original image set, such as samisen vs. guitar, quidditch vs. football. Secondly, the three concepts rarely appear in daily life. They were not included in the ImageNet 1,000 categories, which was used to pre-trained the vision deep CNN. Thirdly, the way the three novel concepts were described is somewhat different from that of the common objects included in the base set. The requirement to diversify the annotated sentences makes the difference of the style for the annotated sentences between NC-3 and MS COCO even larger. The effect of the difference in sentence style lead to decreased performance of the base model compared to that on the NewObj-Cat and NewObj-Motor dataset (see Model-base in Table 5 compared to that in Table 4 on NC test). Furthermore, it appears to have made it harder for the model to hypothesize the meanings of new words from a few sentences.

Faced with these difficulties, an embodiment of the model still learned the semantic meaning of the new concepts quite well. The f scores of the model shown in Table 5 indicate that the model successfully learned the new concepts with a high accuracy from only 50 examples.

It is interesting that Model-retrain performed badly on this dataset. It does not output the word "quidditch" and "samisen" in the generated sentences. The BLEU scores and METEOR are also very low. This is not surprising since there are only a few training examples (i.e., 50) for these three novel concepts and so it is easy to be overwhelmed by other concepts from the original MS COCO dataset.

TABLE 5

Results of the embodiment of the model on the NC-3 Datasets.

| Evaluation Metrics | f | B-3 | B-4 | MET. | f | B-3 | B-4 | MET. |
|---|---|---|---|---|---|---|---|---|
| | quidditch | | | | t-rex | | | |
| Model-retrain | 0.000 | 0.196 | 0.138 | 0.120 | 0.213 | 0.224 | 0.141 | 0.105 |
| Model-base | 0.000 | 0.193 | 0.139 | 0.122 | 0.000 | 0.166 | 0.102 | 0.088 |
| Deep-NVCC | 0.854 | 0.237 | 0.167 | 0.168 | 0.861 | 0.247 | 0.144 | 0.187 |
| Deep-NVCC-1:1Inc | 0.863 | 0.244 | 0.170 | 0.170 | 0.856 | 0.242 | 0.132 | 0.186 |
| | samisen | | | | Base Test | | | |
| Model-retrain | 0.000 | 0.209 | 0.133 | 0.122 | — | 0.412 | 0.328 | 0.234 |
| Model-base | 0.000 | 0.177 | 0.105 | 0.122 | — | 0.414 | 0.325 | 0.240 |
| Deep-NVCC | 0.630 | 0.229 | 0.140 | 0.161 | — | 0.414 | 0.326 | 0.239 |
| Deep-NVCC-1:1Inc | 0.642 | 0.233 | 0.144 | 0.164 | — | 0.414 | 0.327 | 0.239 |

5. Qualitative Results

In Table 6, the five nearest neighbors of the new concepts using the activation of the word-embedding layer learned by the embodiment of the Deep-NVCS model are shown. It shows that the learned novel word embedding vectors captures the semantic information from both language and vision.

TABLE 6

The five nearest neighbors of the new words as measured by the activation of the word-embedding layer.

| New Word | Five nearest neighbors |
|---|---|
| cat | kitten; tabby; puppy; calico; doll; |
| motorcycle | motorbike; moped; vehicle; motor; motorbikes; |
| quidditch | soccer; football; softball; basketball; frisbees; |
| t-rex | giraffe's; bull; pony; goat; burger; |
| samisen | guitar; wii; toothbrushes; purse; ncontents; |

FIG. 12 also shows some sample generated sentence descriptions of the base model and the Deep-NVCS model according to embodiments of the present document. The generated sentences are for the test images from the novel concept datasets. In these examples, cat, motorcycle, quidditch, t-rex, and samisen were the novel concepts, respectively.

In this patent document, embodiments of systems and methods for addressing a Novel Visual Concept learning from Sentences (NVCS) task were disclosed. In this task, systems and methods need to learn novel concepts from sentence descriptions of a few images. The disclosed embodiments allow a model to be trained on a small number of images containing novel concepts. These embodiments performed comparably with the model retrained from scratch on all of the data if the number of novel concept images is large, and performed better when there are only a few training images of novel concepts available. Three novel concept datasets were constructed and were used to validate the effectiveness of the systems and methods disclosed herein. It shall be noted that such systems and methods may be employed to facilitate human-computer interaction, include interfaces, searches, etc.

G. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
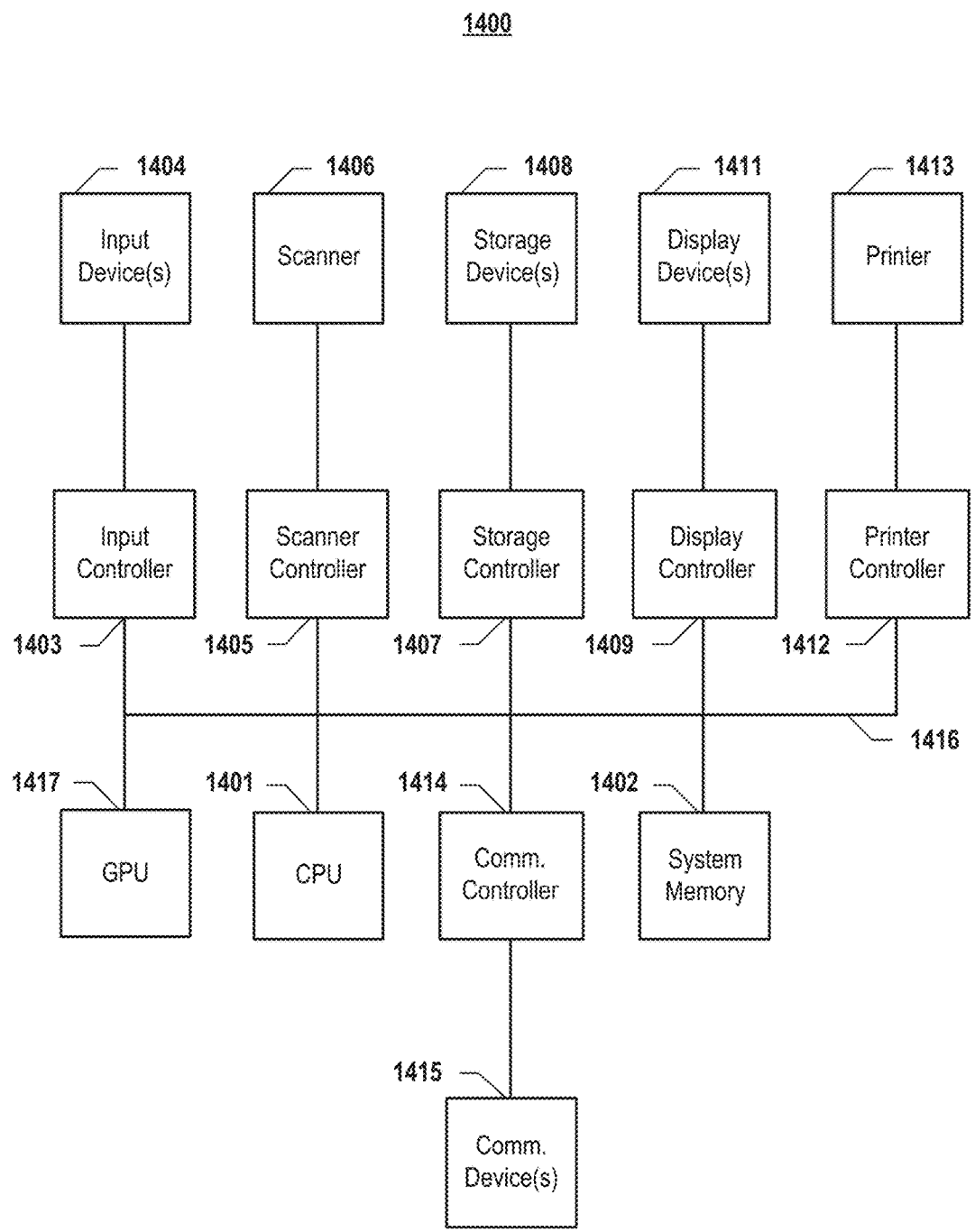
FIG. 14 depicts a simplified block diagram of a computing device/information handling system, in accordance with embodiments of the present document.

FIG. 14 depicts a simplified block diagram of a computing device/information handling system (or computing system) according to embodiments of the present disclosure. It will be understood that the functionalities shown for system 1400 may operate to support various embodiments of an information handling system—although it shall be understood that an information handling system may be differently configured and include different components.

As illustrated in FIG. 14, system 1400 includes one or more central processing units (CPU) 1401 that provides computing resources and controls the computer. CPU 1401 may be implemented with a microprocessor or the like, and may also include one or more graphics processing units (GPU) 1417 and/or a floating point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. System 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. System 1400 may also include a display controller 1409 for providing an interface to a display device 1411, which may be a cathode ray tube (CRT), a thin film transistor (TFT) display, or other type of display. The computing system 1400 may also include a printer controller 1412 for communicating with a printer 1413. A communications controller 1414 may interface with one or more communication devices 1415, which enables system 1400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations.

What is claimed is:

1. A computer-implemented method for enlarging a trained model's word dictionary to describe a novel concept without requiring a complete retraining of the trained model, the method comprising:
   inputting into a multimodal recurrent neural network a set of images and associated captions related to one or more novel concepts not trained in the trained model, the multimodal recurrent neural network comprising:

a convolution neural network layer component that generates an image representation of an input image from the set of images;

at least one word embedding component that encodes meaning of a word from a caption associated with the input image into a word representation;

a recurrent layer component that maps a recurrent layer activation of a prior time frame into a same vector space as a word representation at a current time frame and combines them;

a multimodal component that is distinct from the recurrent layer component and receives a first input from the recurrent layer component and a second input from the convolution neural network layer component and combines them; and a SoftMax layer component that uses an output of the multimodal component to generate a probability distribution of a next word in a caption-level description;

fixing at least some of a set of originally learned weights of the trained model during training of the multimodal recurrent neural network using the set of images and associated captions related to one or more novel concepts; and fixing at least some of a set of baseline probabilities of the trained model during training of the multimodal recurrent neural network using the set of images and associated captions related to one or more novel concepts.

2. The computer-implemented method of claim 1 wherein the multimodal component further receives a third input from the at least one word embedding component.

3. The computer-implemented method of claim 2 wherein the at least one word embedding layer comprises two word embedding layers, in which an output of a first word embedding layer is provided as an input to a second word embedding layer and an output of the second word embedding layer is provided as the third input to the multimodal component.

4. The computer-implemented method of claim 1 wherein the recurrent layer component comprises a Long-Short Term Memory (LSTM) layer.

5. The computer-implemented method of claim 1 wherein the at least one word embedding component receives a weight matrix, $U_D$, from a one-hot layer that represents a word from a caption as an index in the word dictionary.

6. The computer-implemented method of claim 5 further comprising:

decomposing a second weight matrix between the multimodal component and the SoftMax layer component that is used to compute activation of a SoftMax layer in the SoftMax layer component into two sub-matrices; and sharing, in a transposed manner, at least some of values from the weight matrix between the one-hot layer and at least one word embedding layer with at least some values of one of the sub-matrices.

7. The computer-implemented method of claim 5 wherein the step of fixing at least some of a set of originally learned weights of the trained model during training of the multimodal recurrent neural network using the set of images and associated captions related to one or more novel concepts comprises:

separating the weight matrix, $U_D$, between the one-hot layer and at least one word embedding layer into two sub-matrices $U_D=[U_{Do}; U_{Dn}]$, where $U_{Do}$ and $U_{Dn}$ are associated with original words in the work dictionary and the new words of the one or more novel concepts, respectively;

fixing the sub-matrix $U_{Do}$ during training of the one or more novel concepts; and updating the sub-matrix $U_{Dn}$.

8. The computer-implemented method of claim 1 wherein the step of fixing at least some of a set of baseline probabilities of the trained model during training of the multimodal recurrent neural network using the set of images and associated captions related to one or more novel concepts comprises:

separating a set of baseline probabilities, b, used in computing activation of a SoftMax layer in the SoftMax layer component into two parts: $b=[b_o; b_n]$, where $b_o$ and $b_n$ are associated with original words in the work dictionary and new words of the one or more novel concepts, respectively;

converting the original set of baseline probabilities, b, into b' using a centralized activation of an intermediate layer formed between the multimodal component and the SoftMax layer component;

setting every element in $b'_n$ to be an average value of element in $b'_o$; and fixing $b'_n$ during training of the one or more novel concepts.

9. A computer-implemented method for supplemental training of a trained model to describe a novel concept without requiring a complete retraining of the trained model, the method comprising:

inputting into the trained model a set of images and associated captions related to a novel concept not trained in the trained model, the trained model comprising:

a language component comprising at least one word embedding layer and a recurrent layer that maps an index of a word in a word dictionary and taken from a caption into a semantic dense word embedding space and stores word context information in the recurrent layer;

a vision component that generates an image representation of an input image from the set of images;

a multimodal component, which is distinct from the recurrent layer of the language component, that generates a representation using information from the language component and the vision component; and a SoftMax layer component that receives input obtained from the multimodal component and predicts an index of a next word;

fixing at least some of a set of originally learned weights of the trained model during the supplemental training of the trained model; and fixing at least some of a set of baseline probabilities of the trained model during the supplemental training of the trained model.

10. The computer-implemented method of claim 9 wherein the multimodal component further receives a third input from the at least one word embedding component.

11. The computer-implemented method of claim 10 wherein the at least one word embedding layer comprises two word embedding layers, in which an output of a first word embedding layer is provided as an input to a second word embedding layer and an output of the second word embedding layer is provided as the third input to the multimodal component.

12. The computer-implemented method of claim 9 wherein the recurrent layer comprises a Long-Short Term Memory (LSTM) layer.

13. The computer-implemented method of claim 9 wherein the at least one word embedding layer receives a weight matrix, $U_D$, from a one-hot layer that represents a word from a caption as an index in the word dictionary, and the computer-implemented method further comprises:
   decomposing a second weight matrix between the multimodal component and the SoftMax layer component that is used to compute activation of a SoftMax layer in the SoftMax layer component into two sub-matrices; and
   sharing, in a transposed manner, at least some of values from the weight matrix between the one-hot layer and at least one word embedding layer with at least some values of one of the sub-matrices.

14. The computer-implemented method of claim 13 wherein the at least one word embedding layer receives a weight matrix, $U_D$, from a one-hot layer that represents a word from a caption as an index in the word dictionary and wherein the step of fixing at least some of a set of originally learned weights of the trained model during the supplemental training of the trained model comprises:
   separating the weight matrix, $U_D$, between the one-hot layer and at least one word embedding layer into two sub-matrices $U_D=[U_{Do}; U_{Dn}]$, where $U_{Do}$ and $U_{Dn}$ are associated with original words in the work dictionary and the new words of the one or more novel concepts, respectively;
   fixing the sub-matrix $U_{Do}$ during the supplemental training; and
   updating the submatrix $U_{Dn}$.

15. The computer-implemented method of claim 9 wherein the step of fixing at least some of a set of baseline probabilities of the trained model during the supplemental training of the trained model comprises:
   separating a set of baseline probabilities, b, used in computing activation of a SoftMax layer in the SoftMax layer component into two parts: $b=[b_o; b_n]$, where $b_o$ and $b_n$ are associated with original words in the work dictionary and new words of the one or more novel concepts, respectively;
   converting the original set of baseline probabilities, b, into b' using a centralized activation of an intermediate layer formed between the multimodal component and the SoftMax layer component; and
   setting every element in $b'_n$ to be an average value of element in $b'_o$; and
   fixing $b'_n$ during training of the one or more novel concepts.

16. A system for providing supplemental training of a trained model to describe a novel concept without requiring a complete retraining of the trained model, the system comprising:
   an input interface for receiving a set of images and associated captions related to a novel concept not trained in the trained model;
   one or more processors; and
   a non-transitory computer-readable medium or media comprising one or more sequences of instructions which, when executed by the one or more processors, causes steps to be performed comprising:
      inputting into the trained model a set of images and associated captions related to a novel concept not trained in the trained model, the trained model comprising:
         a language component comprising at least one word embedding layer and a recurrent layer that maps an index of a word in a word dictionary and taken from a caption into a semantic dense word embedding space and stores word context information in the recurrent layer;
         a vision component that generates an image representation of an input image from the set of images;
         a multimodal component, which is distinct from the recurrent layer of the language component, that generates a representation using information from the language component and the vision component; and
         a SoftMax layer component that receives input obtained from the multimodal component and predicts an index of a next word;
      fixing at least some of a set of originally learned weights of the trained model during the supplemental training of the trained model; and
      fixing at least some of a set of baseline probabilities of the trained model during the supplemental training of the trained model.

17. The system of claim 16 wherein the multimodal component further receives a third input from the at least one word embedding component.

18. The system of claim 17 wherein the at least one word embedding layer comprises two word embedding layers, in which an output of a first word embedding layer is provided as an input to a second word embedding layer and an output of the second word embedding layer is provided as the third input to the multimodal component.

19. The system of claim 16 wherein the recurrent layer comprises a Long-Short Term Memory (LSTM) layer.

20. The system of claim 16 wherein the at least one word embedding layer receives a weight matrix, $U_D$, from a one-hot layer that represents a word from a caption as an index in the word dictionary, and the non-transitory computer-readable medium or media further comprises one or more sequences of instructions which, when executed by the one or more processors, causes steps to be performed comprising:
   decomposing a second weight matrix between the multimodal component and the SoftMax layer component that is used to compute activation of a SoftMax layer in the SoftMax layer component into two sub-matrices; and
   sharing, in a transposed manner, at least some of values from the weight matrix between the one-hot layer and at least one word embedding layer with at least some values of one of the sub-matrices.

* * * * *